US012695114B2

(12) United States Patent
    Kim et al.

(10) Patent No.:    US 12,695,114 B2
(45) Date of Patent:         Jul. 28, 2026

(54) PROCESSING APPARATUS FOR ELECTRODE ASSEMBLY OF SECONDARY BATTERY

(71) Applicant: Samsung SDI Co., Ltd., Yongin-si (KR)

(72) Inventors: Jung Hyun Kim, Yongin-si (KR); Joo Youn Shin, Yongin-si (KR); Jung Hyun Park, Yongin-si (KR); Joung Ku Kim, Yongin-si (KR); Dong Sub Lee, Yongin-si (KR); Seog Jin Cho, Anyang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 183 days.

(21) Appl. No.: 18/405,847

(22) Filed: Jan. 5, 2024

(65) Prior Publication Data

US 2024/0234784 A1      Jul. 11, 2024

(30) Foreign Application Priority Data

Jan. 5, 2023    (KR) ........................ 10-2023-0001797

(51) Int. Cl.
    H01M 10/04          (2006.01)
(52) U.S. Cl.
    CPC .............................. H01M 10/0409 (2013.01)
(58) Field of Classification Search
    CPC ... H01M 10/0409; B23P 19/04; B23P 11/005; B21D 39/048; B25D 3/26
    See application file for complete search history.

(56) References Cited

U.S. PATENT DOCUMENTS 2,037,663 A  *  4/1936  Lalor ........................ F16K 3/03
                                                      138/45
3,190,330 A  *  6/1965  Hawkins ................. A47J 17/00
                                                      30/294
(Continued)

FOREIGN PATENT DOCUMENTS

KR        10-0599710 B1      7/2006
KR        10-1361193 B1      2/2014
(Continued)

OTHER PUBLICATIONS

Korean Office Action for KR Application No. 10-2023-0001797, dated May 9, 2025, 7 pages.
(Continued)

*Primary Examiner* — Liang Dong
(74) *Attorney, Agent, or Firm* — Womble Bond Dickinson (US) LLP

(57)                ABSTRACT

A processing apparatus for a base material tab protruding from a cylindrical electrode assembly includes: a vertical plate arranged in a second direction perpendicular to a first direction, the first direction being a longitudinal direction of the electrode assembly; a rotatable plate that is a planar plate arranged parallel to the vertical plate and coupled to be rotatable relative to the vertical plate; and a plurality of blades coupled between the vertical plate and the rotatable plate. The blades together form a variable diameter central area defined by ends of the blades according to the relative rotation of the rotatable plate to process the base material tab of the electrode assembly.

9 Claims, 8 Drawing Sheets

(56)                    References Cited

U.S. PATENT DOCUMENTS

| | | | |
|---|---|---|---|
| 7,364,817 B2 | 4/2008 | Lee | |
| 7,530,253 B2 * | 5/2009 | Spenser | .................. B25B 27/10 |
| | | | 72/402 |
| 11,229,941 B1 * | 1/2022 | Boyd | ................... A61F 2/9524 |
| 11,806,807 B2 | 11/2023 | An et al. | |
| 2004/0093720 A1 * | 5/2004 | Motsenbocker | ........ A61F 2/958 |
| | | | 29/700 |
| 2004/0107806 A1 | 6/2004 | Gruber | |
| 2004/0128818 A1 * | 7/2004 | Motsenbocker | ....... B21D 39/04 |
| | | | 29/505 |
| 2006/0024572 A1 | 2/2006 | Lee | |
| 2013/0312269 A1 | 11/2013 | Haworth, Jr. et al. | |
| 2020/0384523 A1 * | 12/2020 | Goff | ................... B21D 39/048 |
| 2022/0126399 A1 | 4/2022 | An et al. | |

FOREIGN PATENT DOCUMENTS

| | | |
|---|---|---|
| KR | 10-2090292 B1 | 3/2020 |
| KR | 10-2022-0056637 A | 5/2022 |
| KR | 10-2022-0140417 A | 10/2022 |
| KR | 10-2022-0143537 A | 10/2022 |

OTHER PUBLICATIONS

Extended European Search Report issued in corresponding EP Application No. 24150544.5, dated Jun. 6, 2024, 8 pages.

* cited by examiner

PROCESSING APPARATUS FOR ELECTRODE ASSEMBLY OF SECONDARY BATTERY

CROSS-REFERENCED TO RELATED APPLICATION

The present application claims priority to and the benefit of Korean Patent Application No. 10-2023-0001797, filed on Jan. 5, 2023, in the Korean Intellectual Property Office, the entire disclosure of which is incorporated herein by reference.

BACKGROUND

1. Field

Aspects of embodiments of the present disclosure relate to a processing apparatus for an electrode assembly of a secondary battery.

2. Description of the Related Art

Secondary batteries are batteries that are designed to be chargeable and dischargeable, unlike primary batteries that are not designed to be chargeable. A low-capacity battery in which one battery cell is packaged in the form of a pack may be used in small, portable electronic devices, such as cellular phones and camcorders, while a high capacity battery including tens or more of battery packs connected to one another may be used as a power source for, as an example, driving a motor of hybrid or electric vehicles.

Secondary batteries are manufactured in various shapes, such as a cylindrical type, a prismatic type, and a pouch type. An electrode assembly, which is provided by interposing a separator between positive and negative electrode plates, and an electrolyte are embedded (or accommodated) and installed in a case, and a cap plate is installed in the case. The electrode assembly is connected with a positive terminal and a negative terminal, which protrude through the cap plate and are exposed to the exterior of the case.

Battery cells, such as secondary battery cells, may be connected to each other in series, parallel, or series-parallel to form a battery pack, which has an increased output and are being used in various fields.

SUMMARY

Embodiments of the present disclosure provide a processing apparatus for an electrode assembly of a secondary battery that is capable of easily compacting a battery material tab.

According to an embodiment of the present disclosure, a processing apparatus for a base material tab protruding from a cylindrical electrode assembly includes: a vertical plate arranged in a second direction perpendicular to a first direction, the first direction being a longitudinal direction of the electrode assembly; a rotatable plate that is a planar plate arranged parallel to the vertical plate and coupled to be rotatable relative to the vertical plate; and a plurality of blades coupled between the vertical plate and the rotatable plate. The blades together form a variable diameter central area defined by ends of the blades according to the relative rotation of the rotatable plate to process the base material tab of the electrode assembly.

The ends of all of the plurality of blades may be arranged at a same angle.

The angle of each of the ends of the blades may correspond to 360° divided by a number of the blades.

Each of the blades may include a first protrusion and a second protrusion on opposite surfaces thereof and facing each other to be respectively coupled to the vertical plate and the rotatable plate.

Each of the rotatable plate and the vertical plate may have a plurality of linear guide holes.

The first protrusion and the second protrusion of the blades may be coupled to one of the guide holes in the rotatable plate and one of the guide holes in the vertical plate, respectively, such that movement of the blade corresponds to an extension direction of the guide holes.

The guide holes in the rotatable plate may be at positions corresponding to the guide holes in the vertical plate.

The guide holes in the rotatable plate may be arranged to extend at an angle with respect to the guide holes in the vertical plate.

The plurality of blades may be configured to vary from a state in which the central area has a diameter equal to or greater than that of the base material tab when the central area is opened to a state in which the central area is has a diameter of zero.

The processing apparatus may further include: a gear part configured to move linearly on one surface of the vertical plate; and an engagement part coupled to one side of the rotatable plate and engaged with the gear part to rotate the rotatable plate according to linear movement of the gear part.

The processing apparatus may further include a support unit configured to move the electrode assembly in the first direction while fixing the electrode assembly.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and, together with the description, explain aspects and features of the present disclosure. In the drawings.

DETAILED DESCRIPTION

Figure 1:
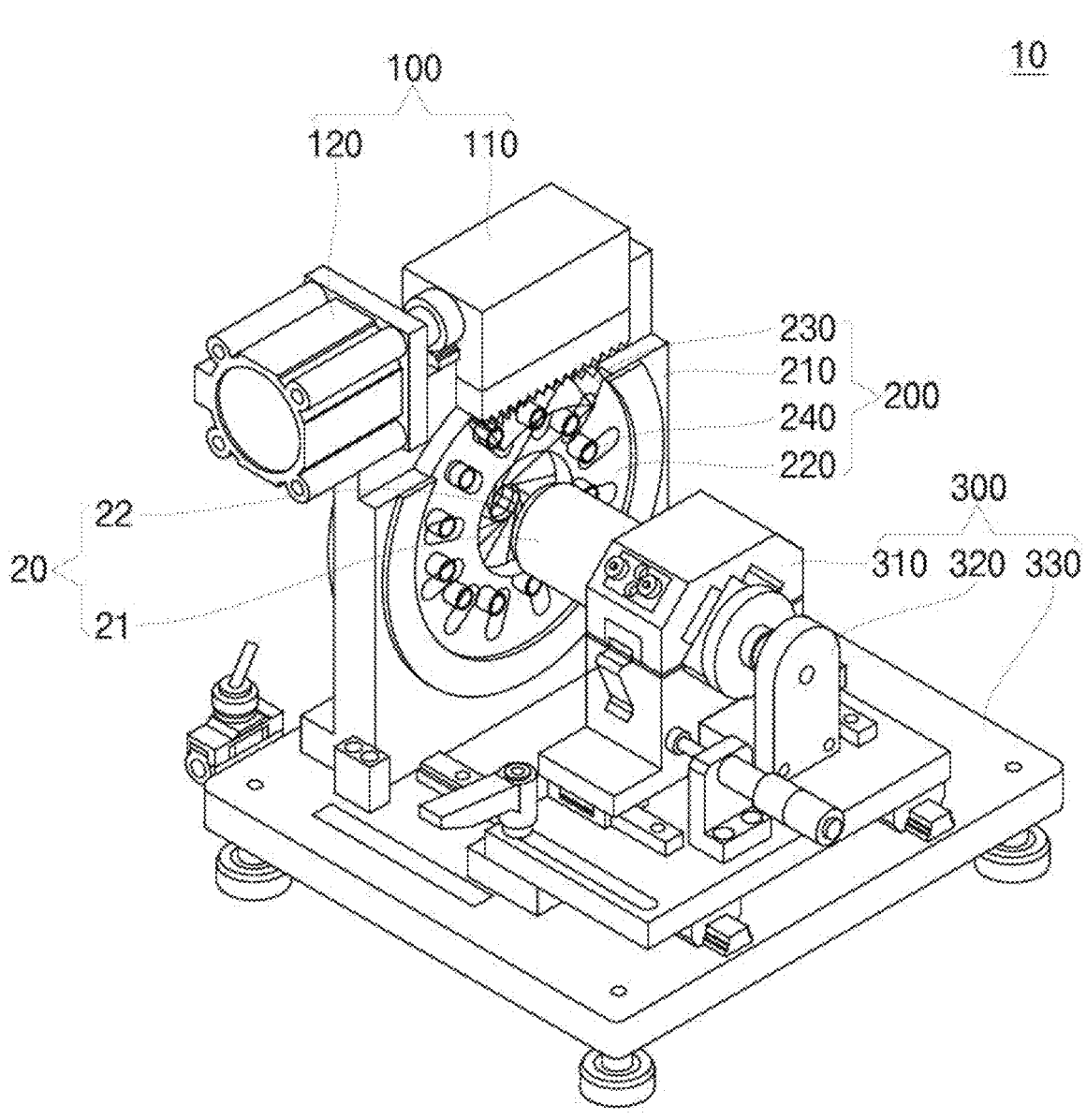
FIG. 1 is a perspective view of a processing apparatus for an electrode assembly according to embodiments.

Hereinafter, embodiments of the present disclosure will be described, in detail, with reference to the accompanying drawings. Embodiments of the present disclosure may however, be embodied in many different forms and should not be construed as being limited to the embodiments set forth herein. Rather, these embodiments are provided so that this disclosure will be thorough and complete, and will fully convey the scope of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, a configuration of a processing apparatus for an electrode assembly of a secondary battery according to embodiments of the present disclosure will be described.

Figure 2A:
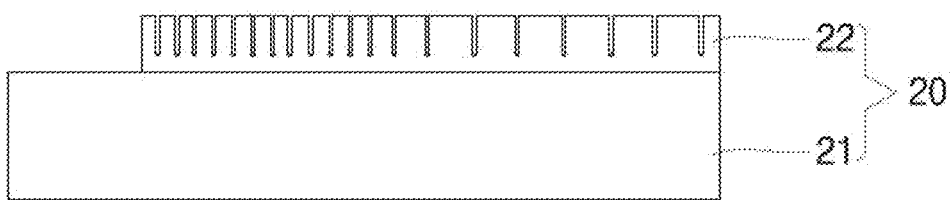
FIGS. 2A and 2B are views of an electrode assembly to be applied to the processing apparatus for the electrode assembly according to embodiments.
Figure 2B:
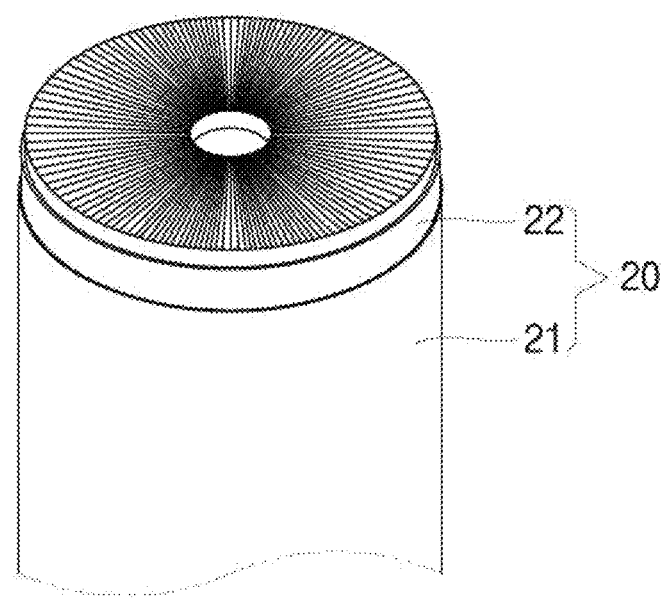

FIG. 1 is a perspective view of a processing apparatus for an electrode assembly according to embodiments. FIGS. 2A and 2B are views of an electrode assembly applied to the processing apparatus for the electrode assembly according to embodiments.

Referring to FIG. 1, a processing apparatus 10 for an electrode assembly according to an embodiment of the present disclosure may include a linear movable unit (e.g., a linear mover) 100, a processing unit 200, and a support unit 300.

The linear movable unit 100 may be disposed on an upper end of the processing apparatus 10 and may include a gear part 110 that moves linearly in one direction and a driving part (e.g., a driver) 120 that linearly drives the gear part 110.

The gear part 110 and the driving part 120 may be connected to each other through a worm gear or the like, and the driving part 120 may be a motor (e.g., a known motor). In some embodiments, a rotational operation of the driving part 120 may be converted to the linear driving in one direction through the worm gear, and thus, the gear part 110 may be linearly driven. In some embodiments, because the driving part 120 operates in both forward and reverse directions, a horizontal position of the gear part 110 may be adjusted according to a control of an operator.

The processing unit 200 may be coupled to the gear part 110. In some embodiments, the processing unit 200 may include a vertical plate 210, a rotatable plate 220 disposed parallel to the vertical plate 210 and configured to rotate in forward/reverse directions, an engagement part 230 coupled to one end of the rotatable plate 220 and engaged with the gear part 110, and a blade 240 disposed between the rotatable plate 220 and the vertical plate 210 to process an electrode assembly 20.

The vertical plate 210 may be disposed below the linear movable unit 100 to fix a vertical position of the linear movable unit 100. In some embodiments, the rotatable plate 220 may be coupled to the vertical plate 210 in parallel and may rotate relative to the vertical plate 210 according to the driving of the engagement part 230. In some embodiments, the blade 240 may be provided in plurality, and a position of each of the blades 240 may be changed according to the rotation of the rotatable plate 220 to adjust a size of a central area at where ends of the blades 240 are gathered, thereby processing the electrode assembly 20.

The support unit 300 may be disposed on a lower end of the processing unit 200 to support the entire structure of the processing unit 200 and the linear movable unit 100. A workbench support unit 300 may include a vertical fixing part 310 that fixes a position of the electrode assembly 20 in a vertical direction, a horizontal moving part 320 that moves the electrode assembly 20 in a horizontal direction, and a table 330 disposed on the floor.

The vertical fixing part 310 may surround (e.g., may extend around a periphery of) the electrode assembly 20, for example, one circumference of the electrode assembly 20 in a state in which the cylindrical electrode assembly 20 is laid down (or arranged) horizontally. In some embodiments, the position of the electrode assembly 20 in the vertical direction, that is, a working height, may be fixed. In some embodiments, the position of the electrode assembly 20 in the vertical direction may be fixed so that a center of the electrode assembly 20 coincides with the central area defined by the ends of the blades 240.

In some embodiments, the horizontal moving part 320 may move the electrode assembly 20, which is fixed by the vertical fixing part 310, in the horizontal direction. The horizontal moving part 320 may push a rear side of the electrode assembly 20 so that the electrode assembly 20 reaches the position of the blade 240 described above. In some embodiments, the horizontal moving part 320 may operate to rotate the position of the electrode assembly 20 again after the processing by the blade 240 is completed.

The table 330 may be disposed on the floor to act as a workbench that supports both the processing unit 200 and the linear movable unit 100 in addition to the vertical fixing part 310 and/or the horizontal moving part 320 of the above-described support unit 300.

As illustrated in FIG. 2A, the electrode assembly 20 may have a configuration in which base material tabs 22, which are a non-coating portion on which an active material is not applied, at one end with respect to an electrode plate 21 that is coated with the active material. In some embodiments, when winding is performed in a state in which a separator is disposed between the electrode plates 21, the cylindrical electrode assembly 20 may be provided as illustrated in FIG. 2B. The base material tabs 22 may protrude upwardly from the electrode assembly 20.

In some embodiments, the processing apparatus 10 for electrode assembly, according to an embodiment of the present disclosure, may perform a compaction process on the base material tabs 22. In some embodiments, a protruding height of each of the base material tabs 22 may be reduced, and members, such as a current collector, may be easily welded to an upper portion of the base material tab 22 at a later step.

Hereinafter, operations of the linear movable unit 100 and the processing unit 200 in the processing apparatus 10 for the electrode assembly, according to an embodiment of the present disclosure, will be described in more detail.

Figure 3:
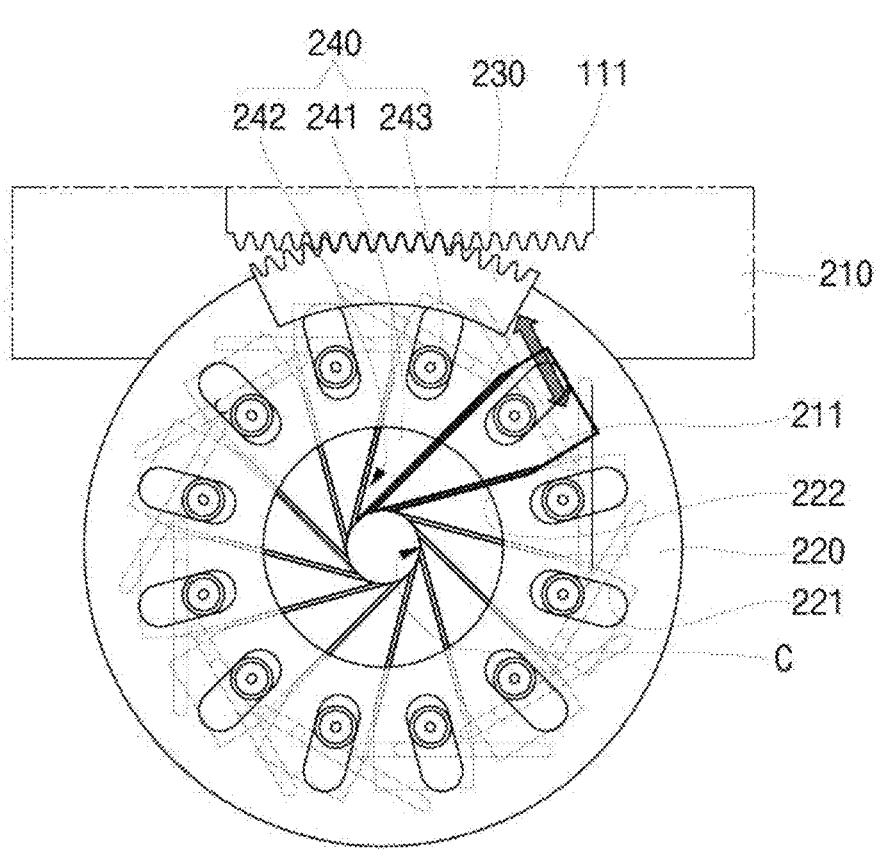
FIG. 3 is a front view of a blade coupled to a linear movable unit and a rotatable plate in the processing apparatus for the electrode assembly according to embodiments.
Figure 4:
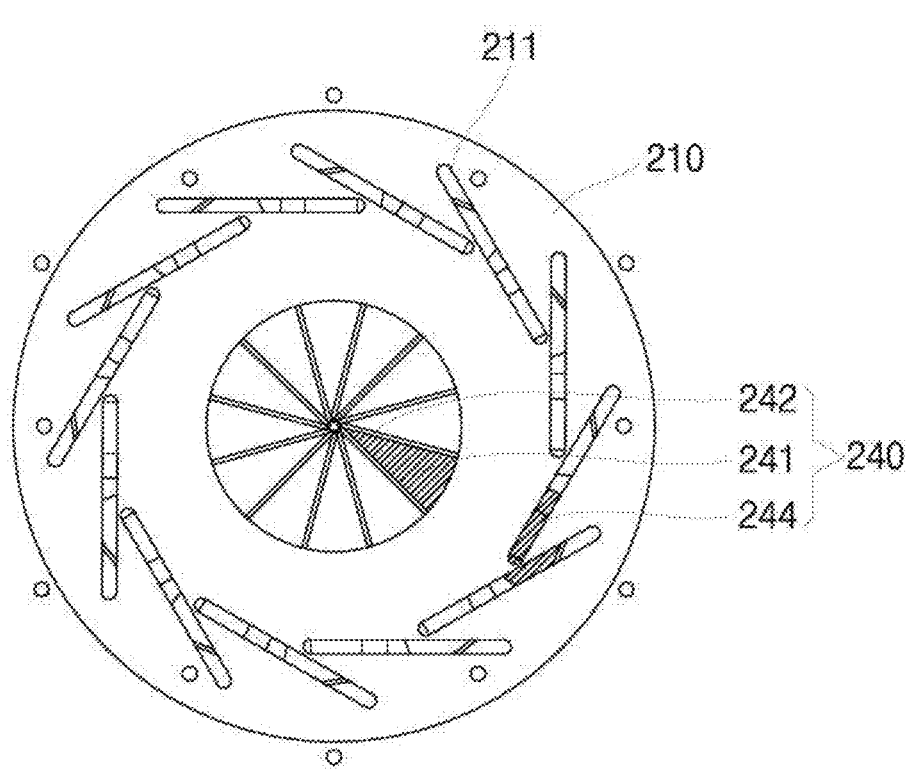
FIG. 4 is a rear view showing the blade coupled to a vertical plate in the processing apparatus for the electrode assembly according to embodiments.
Figure 5:
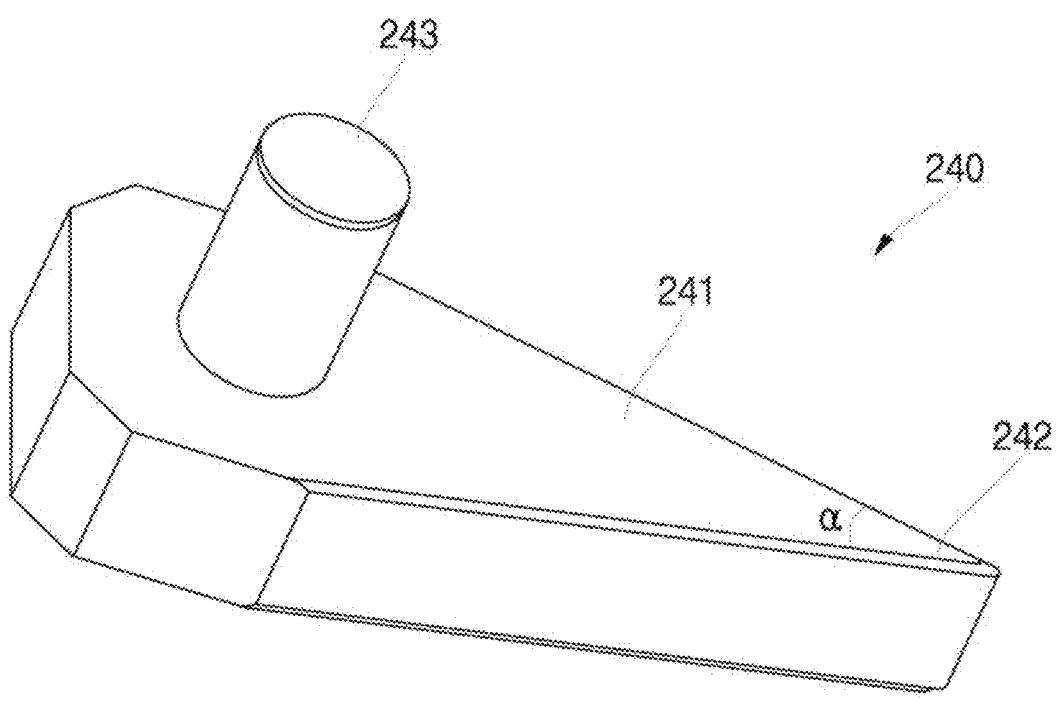
FIGS. 5 and 6 show the blade in the processing apparatus for the electrode assembly according to embodiments.
Figure 6:
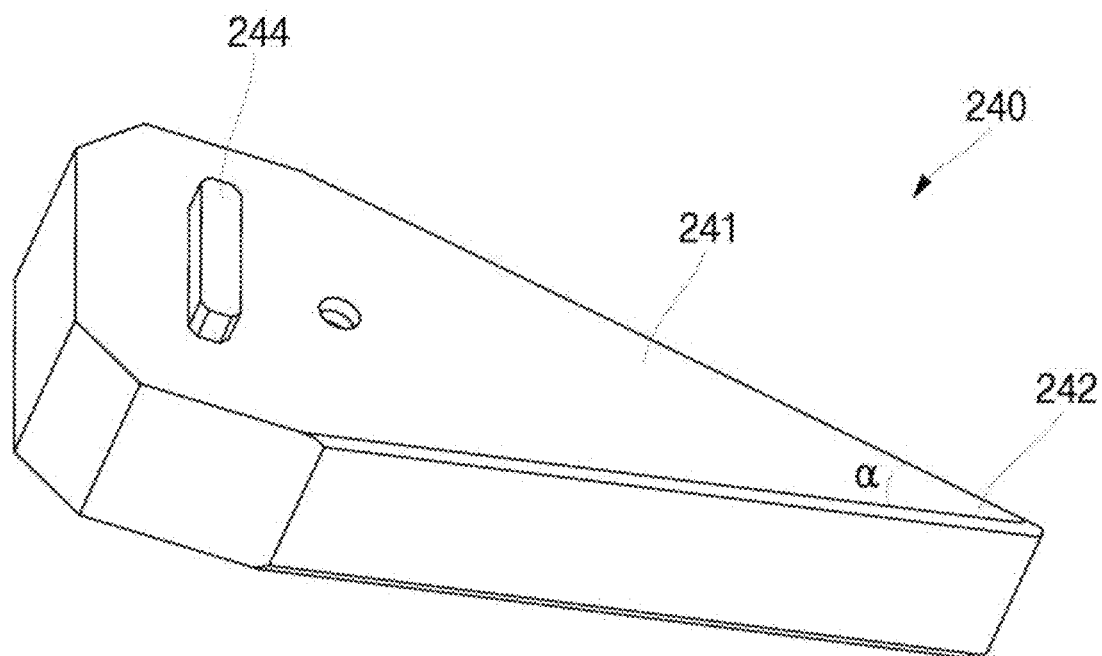

FIG. 3 is a front view of the blade coupled to the linear movable unit and the rotatable plate in the processing apparatus for the electrode assembly according to embodiments. FIG. 4 is a rear view of a state in which the blade is coupled to the vertical plate in the processing apparatus for the electrode assembly according to embodiments. FIGS. 5 and 6 show the blade in the processing apparatus for the electrode assembly according to embodiments.

First, referring to FIG. 3, the processing apparatus 10 for the electrode assembly, according to an embodiment of the present disclosure, may be configured so that the engagement part 230 of the processing unit 200 is coupled to the gear 111 provided on the gear part 110 of the linear movable unit 100. In some embodiments, when the gear 111 also moves linearly in the horizontal direction as the linear movable unit 100 moves in the horizontal direction, the engagement part 230 may rotate accordingly, and the rotatable plate 220 coupled to the engagement part 230 may also rotate at the same angle.

When the rotatable plate 220 rotates, the positions of the plurality of blades 240 disposed between the rotatable plate 220 and the vertical plate 210 may be changed to correspond thereto, and a diameter of a central area C defined by an end (e.g., a distal end) 242 of the blade 240 may vary.

The rotatable plate 220 may have a plurality of guide holes 221 defined therein. In some embodiments, a protrusion disposed on the blade 240 may be coupled to (e.g., inserted into) the guide hole 221. In some embodiments, the rotatable plate 220 may have a processing hole 222 in a center into which the electrode assembly 20 is inserted. The processing hole 222 may be equal to or larger than the diameter of the electrode assembly 20, and the processing, for example, a compacting operation, may be performed in a state in which the base material tab 22 of the electrode assembly 20 is disposed in the processing hole 222.

In some embodiments, referring to FIG. 4, the processing apparatus 10 for the electrode assembly, according to an embodiment of the present disclosure, may have a plurality of the guide holes 211 in the vertical plate 210. Comparing the embodiments shown in FIGS. 3 and 4, the guide holes 211 in the vertical plate 210 may be provided in the same number at positions corresponding to the guide holes 221 in the rotatable plate 220. However, a cutting direction of each of the guide holes 221 in the vertical plate 210 may not be parallel to a cutting direction of the corresponding guide holes 221 in the rotatable plate 220 and may be misaligned to be maintained at a constant angle. The blade 240 coupled between the vertical plate 210 and the rotatable plate 220 may have a shape in which protrusions protruding from both surfaces thereof are coupled to the guide holes 211 and 221, and as the rotatable plate 220 rotates, the positions of the blades 240 may be changed depending on the cutting direction of the guide holes 211 and 221.

As illustrated in FIGS. 5 and 6, the blade 240 may be configured to have an acute angle $\alpha$ with respect to an approximately wedge-shaped body 241, and a first protrusion 243 and a second protrusion 244 are disposed on both surfaces (e.g., opposite surfaces) of the body 241, respectively.

The angle $\alpha$ of an end 242 of the body 241 may relate to (e.g., may correspond to or depend on) the number of blades 240, and may be, for example, an angle that is equal to 360° divided by the number of blades 240. For example, as illustrated in FIG. 3, if the number of blades 240 is 12; thus, the angle $\alpha$ formed at the end 242 of each blade 240 may be about 30°. That is, if all of the ends 242 of the blades 240 move such that the ends thereof are gathered into the central area C, each of the ends 242 may together form a completely closed shape.

The first protrusion 243 may have an approximately cylindrical shape defined on (e.g., protruding from) one side of the body 241 of the blade 240 and may be coupled to the guide hole 221 in the rotatable plate 220 disposed relatively at the front surface. In some embodiments, as illustrated in FIG. 3, movement of the first protrusion 243 may be restricted based on the cutting direction of the guide hole 221 in the rotatable plate 220.

In some embodiments, the second protrusion 244 may be disposed on an opposite surface of the body 241 of the blade 240 that is opposite to the one surface of the body 241 of the blade 240 from which the first protrusion 243 protrudes. The second protrusion 244 may be coupled to the guide hole 211 in the vertical plate 210. In some embodiments, as illustrated in FIG. 4, movement of the second protrusion 244 may also be restricted based on the cutting direction of the guide hole 211 in the vertical plate 210.

Because the first protrusion 243 and the second protrusion 244 are disposed on both surfaces (e.g., opposite surfaces) of one body 241, the position of the blade 240 may be changed (e.g., may be continuously changed) as the rotatable plate 220 rotates, and a diameter of the central area C defined by the ends 242 of the plurality of blades 240 may also be changed (e.g., continuously changed). For example, in FIG. 3, the central area C is illustrated as having a certain diameter, but in FIG. 4, the central area C is illustrated as being a closed shape (e.g., having a diameter of zero).

Hereinafter, a processing operation according to the position of the blade(s) of the processing apparatus 10 for the electrode assembly according to an embodiment of the present disclosure will be sequentially described.

Figure 7A:
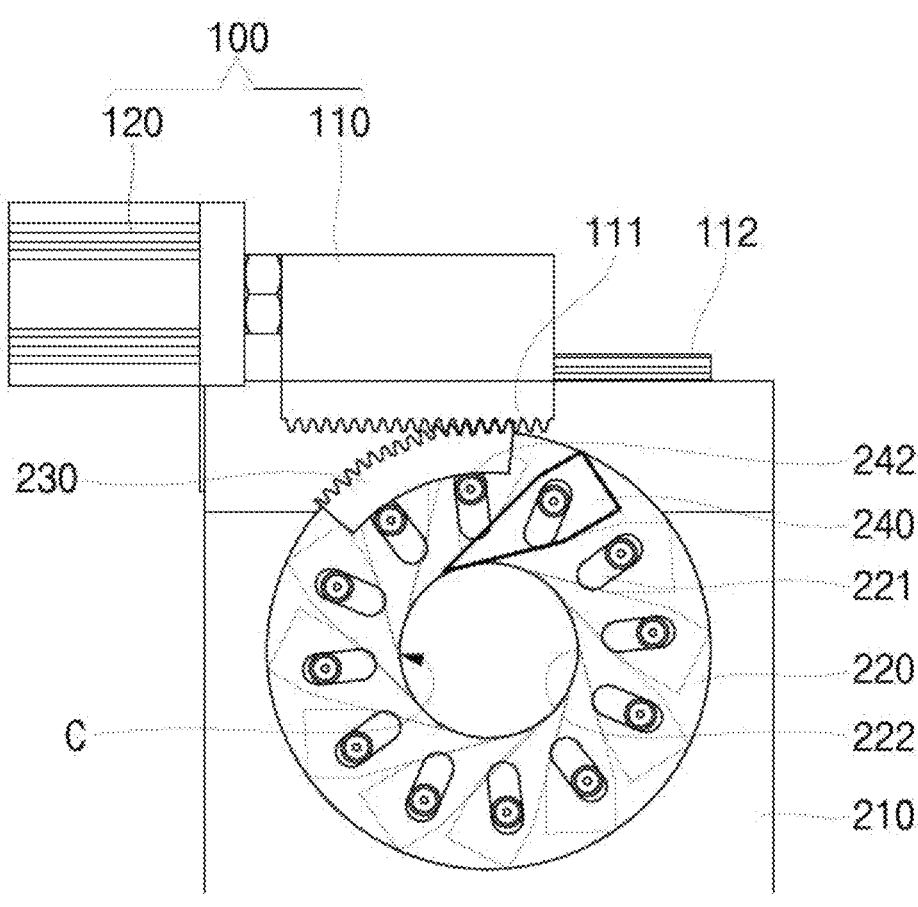
FIGS. 7A to 7C show steps of a process in which a rotatable plate and a compaction plate operate according to an operation of the linear moving part in the processing apparatus for the electrode assembly according to embodiments.
Figure 7B:
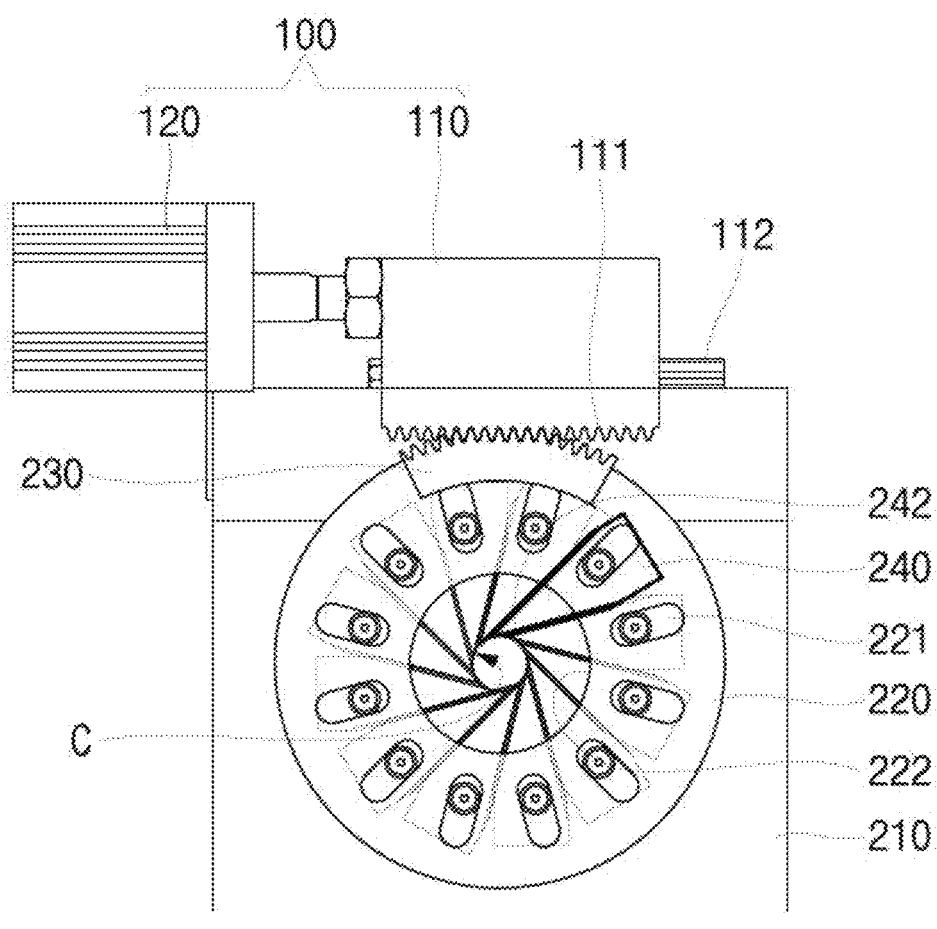
Figure 7C:
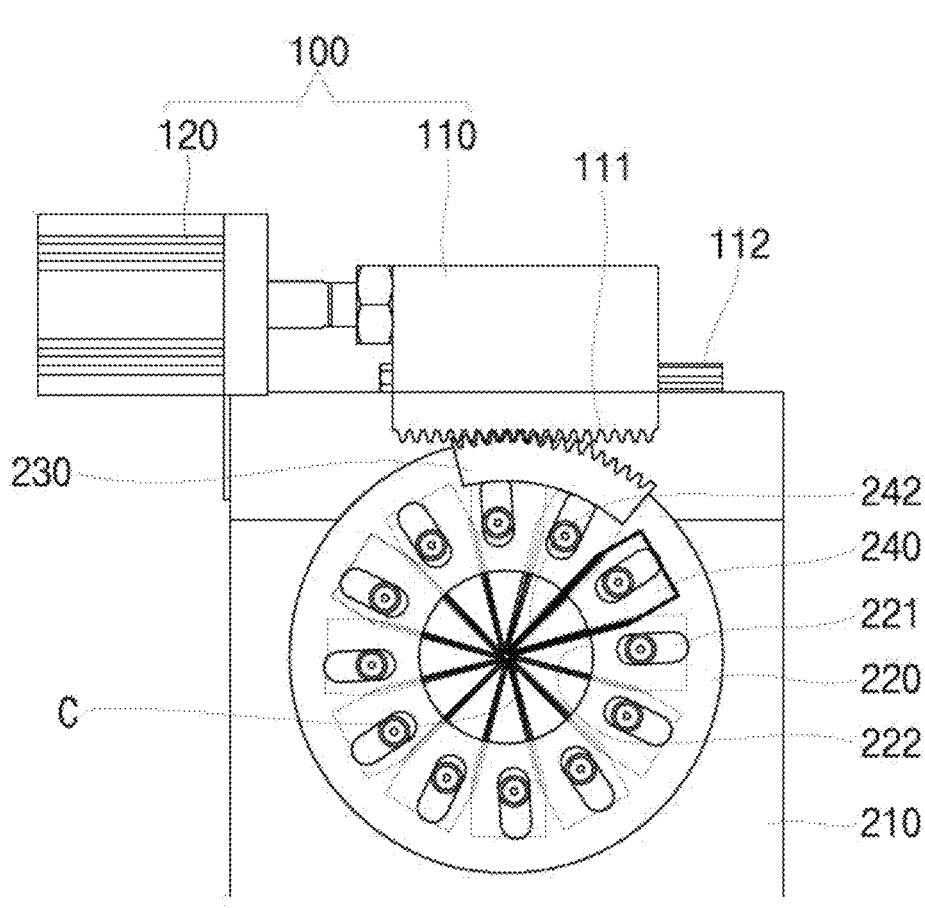

FIGS. 7A to 7C shows steps of a process in which the rotatable plate and the compaction plate operate according to operation of the linear moving part in the processing apparatus for the electrode assembly according to embodiments.

First, referring to FIG. 7A, the gear part 110 of the linear movable unit 100 may be coupled to the driving part 120, and the gear part 110 may be provided as (or may include) a rail 112 that provides a linear path for the gear part 110 and the gear 111.

In some embodiments, the rotatable plate 220 may be engaged with the gear 111 through the engagement part 230 of the processing unit 200, and the blade 240 may be provided between the vertical plate 210 and the rotatable plate 220 as described above.

In some embodiments, the central area C defined by the end 242 of the blade 240 may have approximately the same size as the processing hole (or processing opening) 222 in the rotatable plate 220. In some embodiments, the base material tab 22 of the electrode assembly 20 may enter (or may be inserted into) the central area C of the blade 240 through the processing hole 222 in the rotatable plate 220.

Next, referring to FIG. 7B, the gear 111 of the gear part 110 may move linearly to a right side based on the drawing, and the rotatable plate 220 may rotate in a clockwise direction through the engagement part 230 engaged therewith. In some embodiments, the blade 240, a position of which is restricted in the cutting direction of the guide holes 211 and 221 in the vertical plate 210 and the rotatable plate 220, respectively, may be changed due to the relative rotation of the rotatable plate 220. In some embodiments, the first protrusion 243 may move along the guide hole 221 in the rotational plate 220, and the second protrusion 244 may move along the guide hole 211 in the vertical plate 210 so that each of the blades 240 moves in (e.g., rotates in) a counterclockwise direction. In some embodiments, the ends 242 of the blades 240 may be gathered while moving in a spiral shape in a counterclockwise direction, and thus, as illustrated in FIG. 7B, the central area C defined by the ends 242 of the blades 240 may be modified to have a diameter less than that in FIG. 7A. In some embodiments, the base material tabs 22 of the electrode assembly 20 disposed within the central area C may be gathered by an operation of reducing the central area C, and thus, the compaction process may be performed. In some embodiments, the compaction process may be performed once at an appropriate level according to the diameter of the electrode assembly 20.

Next, referring to FIG. 7C, the gear 111 of the gear part 110 may move farther linearly to the right side based on the drawing, and the rotatable plate 220 may further rotate in the clockwise direction. In some embodiments, the ends 242 of the blades 240 may be further gathered through the same operation, and thus, the shape in which the central area C is approximately closed may be provided by the ends 242. In some embodiments, even when the diameter of the electrode assembly 20 disposed on the central area C is very small due to this operation, the compaction process may be possible, and the processing apparatus 10 for the electrode assembly, according to an embodiment of the present disclosure, may be applicable to electrode assemblies having various diameters.

In the processing apparatus for the electrode assembly of the secondary battery according to embodiments of the present disclosure, the positions of the blades disposed between the vertical plate and the rotatable plate may be changed to easily compact the base material tab of the electrode assembly by the ends of the blades.

The above-mentioned embodiment is merely one embodiment of the processing apparatus for the electrode assembly according to the present disclosure, and thus, the present disclosure is not limited to the foregoing embodiment. Also, it will be understood by those of ordinary skill in the art that various changes in form and details may be made therein without departing from the spirit and scope of the present invention as defined by the following claims and their equivalents.

What is claimed is:

1. A processing apparatus for a base material tab protruding from a cylindrical electrode assembly, the processing apparatus comprising:
   a vertical plate arranged in a second direction perpendicular to a first direction, the first direction being a longitudinal direction of the electrode assembly;
   a rotatable plate that is a planar plate arranged parallel to the vertical plate and coupled to be rotatable relative to the vertical plate; and
   a plurality of blades coupled between the vertical plate and the rotatable plate, the blades together forming a variable diameter central area defined by ends of the blades according to the relative rotation of the rotatable plate to process the base material tab of the electrode assembly,
   wherein each of the blades comprises a first protrusion and a second protrusion on opposite surfaces thereof and facing each other to be respectively coupled to the vertical plate and the rotatable plate, and
   wherein each of the rotatable plate and the vertical plate has a plurality of linear guide holes, and the guide holes in the rotatable plate have a largest extension direction facing toward a center of the central area.

2. The processing apparatus as claimed in claim 1, wherein the ends of all of the plurality of blades are arranged at a same angle.

3. The processing apparatus as claimed in claim 2, wherein the angle of each of the ends of the blades corresponds to 360° divided by a number of the blades.

4. The processing apparatus as claimed in claim 1, wherein the first protrusion and the second protrusion of the blades are coupled to one of the guide holes in the rotatable plate and one of the guide holes in the vertical plate, respectively, such that movement of the blade corresponds to an extension direction of the guide holes.

5. The processing apparatus as claimed in claim 1, wherein the guide holes in the rotatable plate are at positions corresponding to the guide holes in the vertical plate.

6. The processing apparatus as claimed in claim 5, wherein the guide holes in the rotatable plate are arranged to extend at an angle with respect to the guide holes in the vertical plate.

7. The processing apparatus as claimed in claim 1, wherein the plurality of blades are configured to vary from a state in which the central area has a diameter equal to or greater than that of the base material tab when the central area is opened to a state in which the central area is has a diameter of zero.

8. The processing apparatus as claimed in claim 1, further comprising:

a gear part configured to move linearly on one surface of the vertical plate; and an engagement part coupled to one side of the rotatable plate and engaged with the gear part to rotate the rotatable plate according to linear movement of the gear part.

9. The processing apparatus as claimed in claim 1, further comprising a support unit configured to move the electrode assembly in the first direction while fixing the electrode assembly.

\*    \*    \*    \*    \*